United States Patent
Claessen et al.

(10) Patent No.: US 6,754,927 B1
(45) Date of Patent: Jun. 29, 2004

(54) DEVICE FOR DETACHING FILTER CAKES

(75) Inventors: Wilhelm Claessen, Aachen (DE); Karl Grafen, Wuerselen (DE); Menrad Wesp, Herzogenrath (DE)

(73) Assignee: Outokumpu Oyj, Espoo (FI)

( * ) Notice: Subject to any disclaimer, the term of this patent is extended or adjusted under 35 U.S.C. 154(b) by 81 days.

(21) Appl. No.: 10/111,152

(22) PCT Filed: Oct. 11, 2000

(86) PCT No.: PCT/DE00/03576

§ 371 (c)(1),
(2), (4) Date: Apr. 19, 2002

(87) PCT Pub. No.: WO01/30476

PCT Pub. Date: May 3, 2001

(30)  Foreign Application Priority Data

Oct. 22, 1999 (DE) .......................... 199 50 870

(51) Int. Cl.⁷ .............................................. B01D 25/38
(52) U.S. Cl. ......................... 15/93.1; 210/225; 100/198
(58) Field of Search ................................ 210/225, 396; 100/198; 15/93.1, 256.5

(56)  References Cited

U.S. PATENT DOCUMENTS 622,561 A  *  4/1899  Stream ........................ 210/396
4,581,138 A  *  4/1986  Kurita et al. ................ 210/225
5,804,070 A      9/1998  Ponomarenko et al.

FOREIGN PATENT DOCUMENTS

| DE | 19745289 | | 12/1998 | | |
|---|---|---|---|---|---|
| EP | 0718020 | | 6/1996 | | |
| GB | 2114908 | | 9/1983 | | |
| JP | 55-33642 | * | 9/1980 | ................. | 210/225 |
| SU | 990263 | * | 1/1983 | ................. | 210/225 |

* cited by examiner

Primary Examiner—Matthew O. Savage
(74) Attorney, Agent, or Firm—W. F. Fasse; W. G. Fasse

(57)  ABSTRACT

A device (1) for detaching a filter cake which adheres to a filter cloth (4) of a filter press, comprising at least two deflection bodies (2, 3) around which the filter cloth (4) extends in an S-shaped manner and which can be moved in an approximately vertical direction, so that the S-shaped deflection brushes essentially completely over the adhering area of the filter cake. In order to achieve a complete detachment even in the case of filter cake which is not fully filtered out it is proposed filter cloth (4) extends in a sliding fashion during a relative movement between the same deflection bodies (2, 3) over a surface of one deflection body (3) and is provided with bend (8) in its course at a longitudinal edge (7) of said deflection body (3).

7 Claims, 3 Drawing Sheets

DEVICE FOR DETACHING FILTER CAKES

The invention relates to a device for detaching a filter cake which adheres to a filter cloth of a filter press, comprising at least two deflection bodies around which the filter cloth extends in an S-shaped manner and which can be moved in an approximately vertical direction, so that the S-shaped deflection brushes essentially completely over the adhering area of the filter cake. Such a device has already been realized in the filter press for the filtration of suspensions as known from EP 0 718 020 A1. The deflection bodies are arranged in this case as two horizontally aligned rollers which are disposed at opposite sides of the filter cloth and are provided with a horizontal as well as vertical offset of their rotational shafts. Both rollers are combined into a module by way of coupling elements which are provided with laterally projecting carriers which enable all pairs of rollers to be simultaneously brought into engagement with a vertically movable lifting device and can thus be moved upwardly and downwardly.

Whereas the pairs of rollers are disposed below the filter plates in the compressed state of the filter plate packet, i.e. during the actual filtration process, the upward and downward movement of the pairs of rollers and thus the detachment of the filter cake occurs after the termination of the filtration process and the horizontal removal of adjacent filter plates to the so-called discharging distance.

A further development of the filter press as known from EP 0 718 020 A1 is described in DE 197 45 289 C1. In order to avoid the simultaneous lifting and lowering of all pairs of rollers, the lifting device which extends over the entire length of the filter press is provided with a driver carriage which is movable in the longitudinal direction of the filter plate and can be brought into engagement with merely a small number of filter plates. As a result, only the pairs of rollers of the filter plates brought previously to the mutual discharging distance can be lifted. The principal of the S-shaped deflection of the filter cloth with the help of two rollers has remained unchanged, however.

When applying the known principle of filter cake detachment it may occur, especially in cases where the cake is not completely filtered out or is adhesive, that parts of the cake will not detach from the filter cloth despite the comparably strong deflection in the zone of the rollers, as a result of which the build-up of a homogeneous filter cake can be impaired during a subsequent filtration process. Moreover, the degree of soiling of the filter cloths may increase by the potentially incomplete detachment of the filter cake, which requires the frequent application of a special cleaning device by using a pressurized cleaning liquid.

Furthermore, the cake residues adhering to the filter cloth are applied on the roller jacket of the inner roller during the lifting and lowering of the pairs of rollers.

The invention is based on the object of further developing the known detachment device in such a way that any adherence of cake residue on the filter cloth and on the deflection bodies is prevented.

Based on a device of the kind as described above, this object is achieved in accordance with the invention in such a way that the filter cloth extends in a sliding fashion during a relative movement between the same and the deflection bodies over a surface of at least one deflection body and is provided with a bend in its course at a longitudinal edge of said deflection body.

According to the invention, at least one deflection body is thus arranged in such a way that it fulfils both the function of the deflection of the filter cloth as well as the function of a scraper brushing over the filter cloth surface. As a result of the bend in the course of the filter cloth it is ensured that the filter cloth will rest securely on the longitudinal edge of the deflection body which performs the scraper function. The sliding of the filter cloth over the non-rotating deflection body in accordance with the invention ensures a relative movement between the scraper edge and the cloth, which forms a basic prerequisite for the achievement of the scraping effect.

As a result of providing a combined scraper and deflection element in accordance with the invention, the construction is characterized by low production costs, especially in comparison with a solution in which a scraper device is disposed as an additional component between the two rollers. Moreover, the need for space for the detachment device according to the invention is lower than in a construction with an additional scraper device.

Preferably, the deflection body which is the second one during the detaching process in the direction of movement of the cloth is provided in accordance with an embodiment of the invention with a longitudinal edge which produces a bend and faces the first deflection body.

It is ensured in this manner that the scraping effect is performed directly after a detachment of the main part of the filter cake on the first deflection body. This residual detachment with the help of the scraper occurs at a time before the filter cloth comes into contact with its side facing the filter cake with the deflection surfaces of the second deflection body, so that their soiling is minimized.

It is particularly favorable from a production viewpoint if the deflection body is a scraper plate which is C-shaped with respect to its cross section in its end section and is provided with a wedge angle which starts out from its longitudinal edge and is in the range of between 45° and 90°.

In conjunction with the acute wedge angle, the C-shape of the scraper plate ensures a secure take-up and deflection of the scrape filter cake residue. The acute wedge angle represents in this connection a high efficiency of the scraper effect.

In a further development of the invention it is provided that the filter cloth is deflected in the zone of the longitudinal edge by an angle of between 2° and 20°. This ensures a sufficiently reliable contact of the filter cloth on the longitudinal edge and still a protection of the filter cloth material.

It is further particularly preferable if the angle of wrap of the filter cloth about the scraper plate is between 60° and 120° and the scraper plate is provided with a thickness in the range of between 1 mm and 8 mm in a zone adjacent to the longitudinal edge.

It is further provided in accordance with the invention that both deflection bodies are rigidly connected with one another via coupling elements and can thus be lifted and lowered in a forced synchronized manner with the help of a lifting device.

The detaching device is only disposed on the filter plate side on which the filter cake remains adhering to the filter cloth. According to experience, this is the case with chamber filter plates.

A particularly advantageous further development of the device in accordance with the invention is that on each face side of every other filter plate two coupling elements each are flexibly connected with one another and can be brought jointly into engagement with the lifting device.

In this way the lifting device grasps two coupling elements simultaneously via a single carrier on each side of the filter plate and thus produces the cake detachment of a common filter cloth on both sides of a chamber plate. In this case it is not necessary that the membrane plates are provided with detaching devices.

The invention is now explained in closer detail by reference to an embodiment of a detaching device which is shown in the drawing, wherein.

Figure 1:
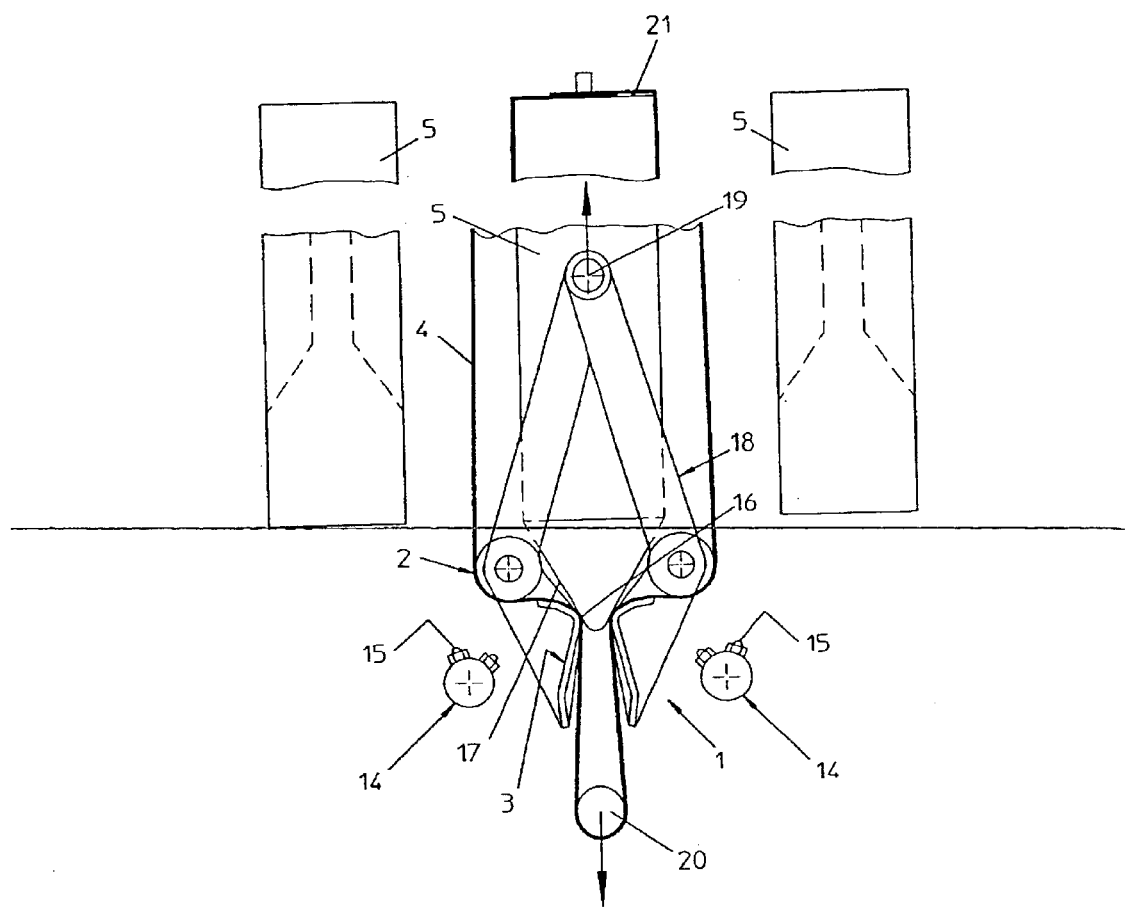
FIG. 1 shows a cross-sectional view through the device in a position below the associated filter plate.

A detaching device 1 comprises two deflection bodies 2 and 3, of which the deflection body 2 is arranged as a roller extending over the entire width of the filter cloth 4 and the deflection body 3 as a scraper plate.

The filter cloth 4 extends in an S-shaped manner between the two deflection bodies 2 and 3. The filter cloth 4 extends above and below the detaching device 1 approximately parallel to the plane of a filter plate 5 which is associated with the detaching device 1 and which concerns a so-called chamber plate (without the pressure membrane). The filter plate packet consists of chamber and membrane plates which are disposed alternatingly one after the other and which enclose a filter chamber each between themselves.

The rotational shaft of the roller and the scraper plate are rigidly connected with each other by means of face-sided coupling elements 18 which will be described below in closer detail. This allows a forced synchronized upward and downward movement of the two deflection bodies 2 and 3 with the help of a single carrier on each face side for example, which are provided on the coupling elements 18 in an outwardly projecting way.

In the zone of the roller forming the upper deflection body 2 there is a first, approximately 90° deflection of the filter cloth 4 in the direction towards filter plate 5, with the radius of curvature 6 being approximately 20 mm. This deflection is sufficiently strong in order to ensure the complete detachment from the filter cloth 4 of a filter cake which is "uncritical" with respect to its detachment in the normal case. In the case of filter cakes which have not been filtered completely or are adhesive, it may occur that no complete detachment occurs in the zone of the deflection body 2, so that cake residue may remain attached to the filter cloth 4.

In the zone of the front longitudinal edge 7 of the deflection body 3 which is arranged as a scraper plate 3, the filter cloth 4 is provided in its course with a bend 8 through which it rests securely on the longitudinal edge 7. In conjunction with a wedge angle 9 which starts out from the same, it acts like a scraper blade which will securely remove any cake residue adhering to the filter cloth 4.

The scraper plate is provided in its cross section with a C-shaped arrangement in its end section facing the deflection body 2. In conjunction with its comparatively low thickness 10 in the range of approx. 4 mm, this ensures that the detached filter cake penetrates the interior of the C and is discharged from there by way of a surface section 11. The filter cloth 4 is deflected in a sharp-edged way about an angle 12 of approx. 15° and wraps around the scraper plate with an angle of wrap 13 of approx. 90°.

A cleaning device 14 is further movable with the lifting device (not shown in closer detail), which cleaning device is equipped with spray nozzles 15 with which the cloth or the inner side of the C-shaped scraper plate can be cleaned of any adhering filter residues.

Whereas the detaching device 1 is disposed in the actual filter operation of the filter press below the associated filter plate 5, namely essentially within its vertical projection (FIG. 1), there is an upward and downward movement of the mutually coupled deflection elements 2 and 3 after the removal of adjacent filter plates 5 to the discharging distance in order to perform a detachment of the filter cake and/or a cleaning by means of the cleaning device 14.

From the lower dead center position as shown in FIG. 1, the device 1 moves upwardly inclined following the upward movement of the lifting device, with a curved zone 16 of the scraper plate resting on a run-up incline 17 below the actual filter plate 5. In the course of the upward movement, the deflection body 3, which is shaped as a scraper plate, swivels outwardly together with the coupling element 18 which is arranged in the manner of an oscillating lever, so that the curved zone 16 rests on the plate surface. Two coupling elements 18 which are disposed on opposite sides of the filter plate 5 are flexibly mutually connected by way of a rotational shaft 19 which is disposed in the axis of symmetry of the filter plate 5. Such a unit of two coupling elements 18 can be lifted with the help of a single carrier which can be coupled with the lifting device. Due to the thickness of the filter plate 5, which decreases in a ramp-like manner to zero in the zone of the run-up incline 17, both sections of the filter cloth 4 which are tensioned downwardly with the help of a weight 20 and are deflected to the other filter plate side are situated between the sides of the filter plate 5 which are opposite of the two scraper plates. The maximum widening of the V, which is formed by the coupling elements 18 and stands on its head, occurs as soon as the scraper plate has left the run-up incline 17.

Figure 2:
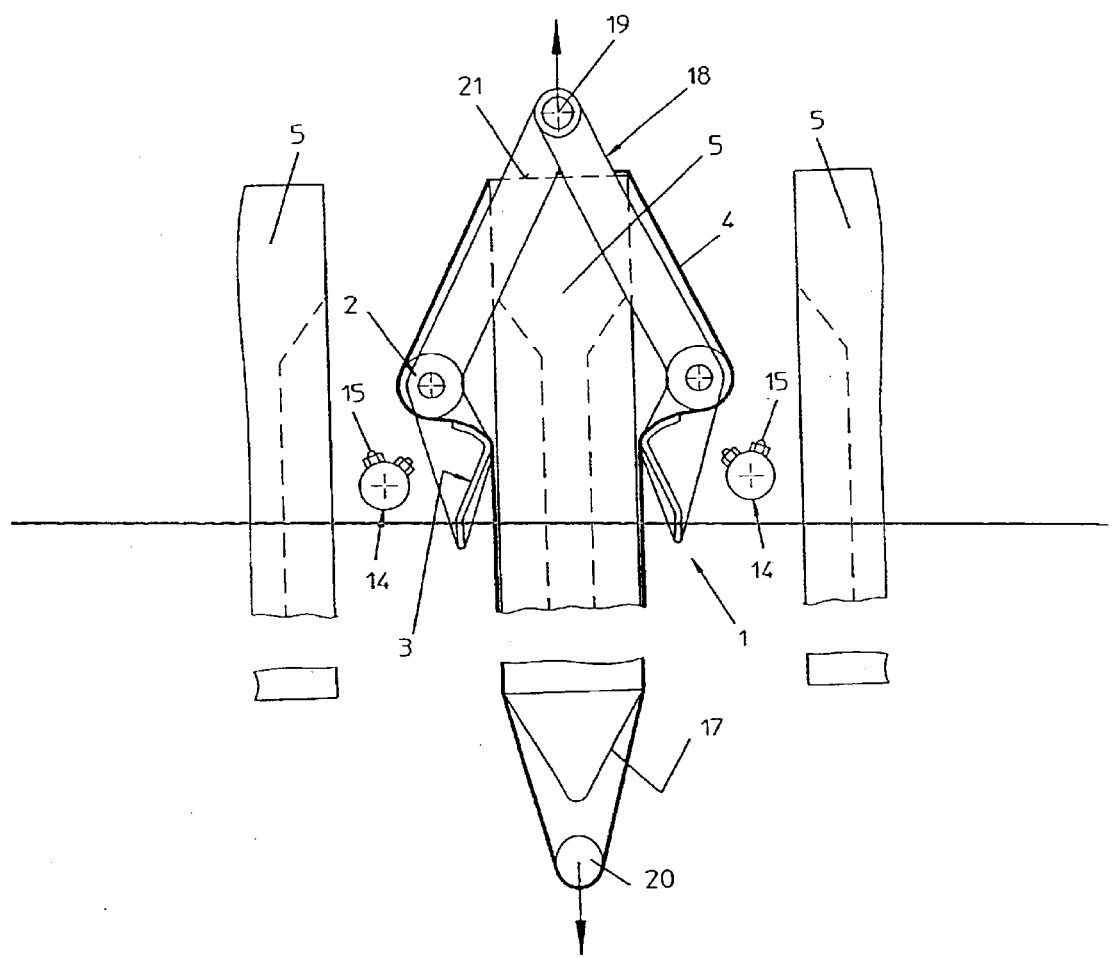
FIG. 2 shows a representation as in FIG. 1 but in the upper deflection position.
Figure 3:
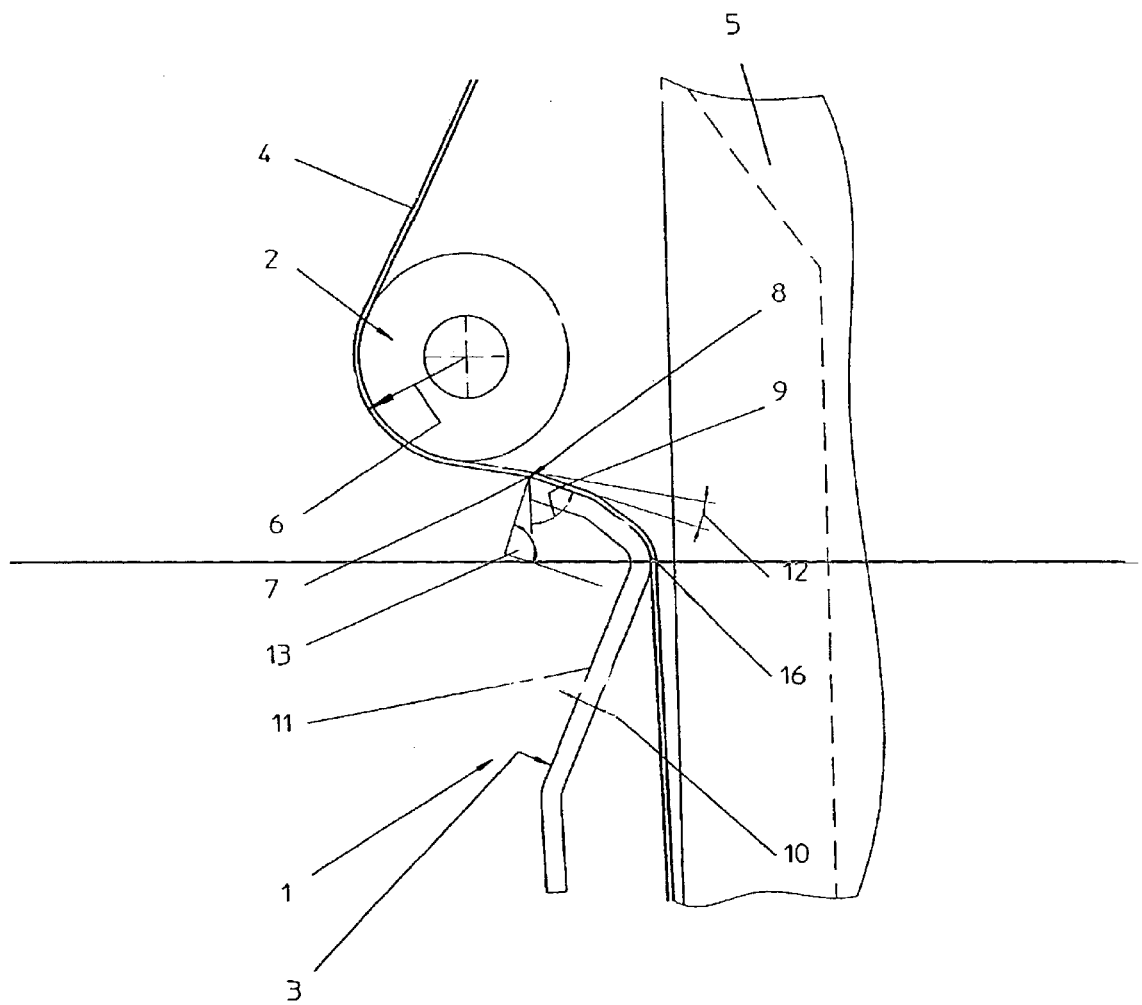
FIG. 3 shows an enlarged sectional view of the deflection body on one side of a plate.

In FIG. 2, the device 1 has reached its upper reversing position in which the entire filter surface of the filter plate 5 has been substantially brushed over by the deflection bodies 2 and 3. The filter cloth 4 is fastened to the upper face side 21 of the filter plate 5.

What is claimed is:

1. A device (1) for detaching a filter cake which adheres to a filter cloth (4) of a filter plate (5) of a filter press, comprising first and second deflection bodies (2, 3) around which the filter cloth (4) extends in an S-shaped manner and which are connected together and can be moved together as a unit in an approximately vertical direction, so that an S-shaped deflection produced by said first and second deflection bodies (2, 3) brushes essentially completely over an adhering area of the filter cake, wherein said deflection bodies (2, 3) are arranged such that the filter cloth (4) extends in a sliding fashion during a relative movement between the same and the deflection bodies (2, 3) over a surface of said second deflection body (3) and is provided with a bend (8) in its course at a longitudinal edge (7) of said second deflection body (3) that faces said first deflection body (2).

2. A device as claimed in claim 1, characterized in that the second deflection body (3) is a scraper plate which is C-shaped with respect to its cross section in its end section and is provided with a wedge angle (9) which starts out from its longitudinal edge (7) and is in the range of between 45° and 90°.

3. A device as claimed in claim 2, characterized in that the angle of wrap (13) of the filter cloth (4) about the scraper plate is between 60° and 120°.

4. A device as claimed in claim 2, characterized in that the scraper plate is provided with a thickness range of between 1 mm and 8 mm in the zone adjacent to the longitudinal edge (7).

5. A device as claimed in claim 1, characterized in that the filter cloth (4) is deflected in the zone of the longitudinal edge (7) by an angle (12) of between 2° and 20°.

6. A device as claimed in claim 1, characterized in that both deflection bodies (2, 3) are mutually rigidly connected by means of coupling elements (18) disposed on either side adjacent to the associated filter plate.

7. A device as claimed in claim 6, characterized in that on each face side of every other filter plate (5) two coupling elements (18) each are flexibly connected with one another and can be brought jointly into engagement with a lifting device.

* * * * *